(12) United States Patent
Tanaka et al.

(10) Patent No.: US 9,869,805 B2
(45) Date of Patent: Jan. 16, 2018

(54) INFRARED REFLECTIVE FILM, AND LAMINATED GLASS EMPLOYING SAME

(71) Applicants: Nippon Kayaku Co., Ltd., Chiyoda-ku (JP); BASF SE, Ludwigshafen (DE); Central Glass Co.Ltd., Ube-shi (JP)

(72) Inventors: Kouichi Tanaka, Kita-ku (JP); Hideyoshi Fujisawa, Kita-ku (JP); Kensuke Izutani, Matsusaka (JP); Satoshi Nishiyama, Matsusaka (JP); Atsushi Takamatsu, Matsusaka (JP); Akira Matsumoto, Amagasaki (JP); Masayoshi Furukawa, Osaka (JP)

(73) Assignees: Nippon Kayaku Co., Ltd., Chiyoda-ku (JP); BASF SE, Ludwigshafen (DE); Central Glass Co., Ltd., Ube-shi (JP)

( * ) Notice: Subject to any disclaimer, the term of this patent is extended or adjusted under 35 U.S.C. 154(b) by 37 days.

(21) Appl. No.: 14/892,143

(22) PCT Filed: May 23, 2014

(86) PCT No.: PCT/EP2014/060698
§ 371 (c)(1),
(2) Date: Nov. 18, 2015

(87) PCT Pub. No.: WO2014/191320
PCT Pub. Date: Dec. 4, 2014

(65) Prior Publication Data
US 2016/0085002 A1    Mar. 24, 2016

(30) Foreign Application Priority Data
May 30, 2013 (JP) ................................ 2013-114267

(51) Int. Cl.
*G02B 5/20* (2006.01)
*B32B 7/06* (2006.01)
(Continued)

(52) U.S. Cl.
CPC ............... *G02B 5/208* (2013.01); *B32B 7/06* (2013.01); *B32B 17/10036* (2013.01);
(Continued)

(58) Field of Classification Search
CPC ...................................................... G02B 5/208
See application file for complete search history.

(56) References Cited

U.S. PATENT DOCUMENTS

2007/0109673 A1    5/2007  Padiyath et al.
2008/0206533 A1    8/2008  Yaoita et al.
(Continued)

FOREIGN PATENT DOCUMENTS

EP    1 923 365 A1    5/2008
EP    2 442 161 A1    4/2012
(Continued)

OTHER PUBLICATIONS

International Search Report dated Jul. 29, 2014 in PCT/EP2014/060698.

*Primary Examiner* — Edmond Lau
(74) *Attorney, Agent, or Firm* — Oblon, McClelland, Maier & Neustadt, L.L.P.

(57) ABSTRACT

The present invention has the objective of providing an infrared reflective film by means of which it is possible to achieve an effective heat-shielding performance with a smaller number of layers than hitherto using a construction employing specified infrared reflective layers. Solution Means The infrared reflective film of the present invention has at least two infrared reflective layers and, of these infrared reflective layers, the center reflective wavelength of at least one infrared reflective layer is between 1200 and 1300 nm. Furthermore, the laminated glass of the present invention is formed by interposing this infrared reflective (Continued)

film between two sheets of intermediate film, and laminating these between two sheets of glass.

8 Claims, 2 Drawing Sheets

(51) Int. Cl.
| | | |
|---|---|---|
| *B32B 17/10* | (2006.01) | |
| *G02B 5/30* | (2006.01) | |
| *G02B 5/28* | (2006.01) | |
| *G02B 5/08* | (2006.01) | |
| *G02B 5/26* | (2006.01) | |

(52) U.S. Cl.
CPC .. *B32B 17/10458* (2013.01); *B32B 17/10633* (2013.01); *B32B 17/10761* (2013.01); *B32B 17/10788* (2013.01); *G02B 5/0816* (2013.01); *G02B 5/26* (2013.01); *G02B 5/282* (2013.01); *G02B 5/3016* (2013.01)

(56) References Cited

U.S. PATENT DOCUMENTS

| | | |
|---|---|---|
| 2011/0097562 A1 | 4/2011 | Brill et al. |
| 2011/0181820 A1 | 7/2011 | Watanabe |
| 2012/0050847 A1* | 3/2012 | Watanabe .............. C09K 19/14 |
| | | 359/352 |
| 2012/0086904 A1 | 4/2012 | Oki et al. |
| 2012/0202084 A1 | 8/2012 | Tamura |
| 2012/0327318 A1* | 12/2012 | Tamura ............. B32B 17/10036 |
| | | 349/16 |
| 2013/0122281 A1* | 5/2013 | Hakuta ................. C03C 17/007 |
| | | 428/323 |

FOREIGN PATENT DOCUMENTS

| | | |
|---|---|---|
| EP | 2 677 352 A1 | 12/2013 |
| JP | 9-506837 A | 7/1997 |
| JP | 2011-525154 A | 9/2011 |
| JP | 2011-253094 A | 12/2011 |
| WO | WO 2012/111715 A1 | 8/2012 |

\* cited by examiner

INFRARED REFLECTIVE FILM, AND LAMINATED GLASS EMPLOYING SAME

The present invention relates to an infrared reflective film having at least two infrared reflective layers for use, primarily, as the window glass for buildings and motor vehicles, etc.; and to laminated glass employing same.

TECHNICAL BACKGROUND

So-called heat-shielding performance, based on the reflection or absorption of infrared radiation, can be assessed by determining the solar heat gain coefficient specified by JIS R 3106 or the solar total transmittance ($T_{TS}$) specified by ISO13837. The lower the $T_{TS}$, the higher the heat-shielding performance, so that the air-conditioning load can be reduced. A reduction in $T_{TS}$ can be achieved by arranging a reflecting or absorbing component at the positions of entry of the solar radiation, so as to deal with the sunlight spectrum range from ultraviolet to infrared, but lowering transmittance in the visible light region normally brings about a reduction in window visibility. Furthermore, in the case of the front window glass (the windscreen) of an automobile, there is a regulation that the visible light transmittance should be at least 70%, so it is difficult to lower $T_{TS}$ by controlling the transmittance of visible light. Hence, in order to lower $T_{TS}$ in the case of an automobile windscreen, the problem to be addressed is how to efficiently reduce transmittance in the infrared spectrum region in some way, by reflection or absorption.

To tackle with this problem, in Patent Document 1 there is disclosed a thermally-insulating sheet formed by laminating a plurality of layers, specifically at least 6 layers, where said layers are formed by fixing a cholesteric liquid crystal phase wherein the helical pitch has been controlled so as to be consistent with a wavelength in the range 751-2000 nm. In accordance therewith, by laminating a plurality of fixed cholesteric liquid crystal layers of different reflective wavelengths, it is possible to lower the transmittance over the infrared spectrum region (780-1700 nm).

PRIOR ART LITERATURE

Patent Documents

Patent Document 1 Tokuhyō Published Translation of a Foreign PCT Application No 2011-525154

The solar heat gain coefficient ($T_{TS}$) can be reduced if high reflectance or low transmittance is shown over a broad band but, in the case of the technique described in Patent Document 1, a considerable number of cholesteric liquid crystal layers has to be laminated in order to achieve a lowering in $T_{TS}$, so there is an increase in the number of processing stages and, along with this, a rise in cost and a lowering in yield. Additionally, the so-called near infrared region in the vicinity of 780-950 nm overlaps wavelengths used for purposes of communication, such as in the case of remote control devices, etc., so, while there is a lowering of the solar heat gain coefficient when there is a high degree of reflection or absorption in this region of the spectrum, there is, at the same time, a concern that communication problems may be brought about.

OUTLINE OF THE INVENTION

Problem to be Solved by the Invention

The present invention has the objective of providing an infrared reflective film by means of which heat-shielding performance can be effectively realized with a smaller number of layers than hitherto using a construction employing specified infrared reflective layers, together with a laminated glass employing same.

Means for Solving the Problem

As a result of painstaking research to solve the aforesaid problem the present inventors have newly discovered that, by reflection of a specified wavelength region in the infrared spectrum, the same level of effective heat-shielding performance is realized when compared to the case of a greater number of reflective wavelengths, in spite of there being a higher solar heat gain coefficient. Moreover, not only can the processing stages be reduced but also, with this structure, there is no effect on the near infrared region, and it is on these discoveries that the present invention is based.

Specifically, the essential structural features of the present invention are as follows.

(1) An infrared reflective film having at least two infrared reflective layers and, of these infrared reflective layers, the center reflective wavelength of at least one infrared reflective layer is between 1200 and 1300 nm.

(2) An infrared reflective film as described in (1) above, wherein, of the aforesaid at least two infrared reflective layers, the center reflective wavelength of at least one infrared reflective layer is between 1200 and 1300 nm and, furthermore, the center reflective wavelength of at least one infrared reflective layer is between 1500 and 1600 nm.

(3) An infrared reflective film as described in (1) above, wherein, of aforesaid at least two infrared reflective layers, the center reflective wavelength of at least one infrared reflective layer is between 1200 and 1300 nm and, furthermore, the center reflective wavelength of at least one infrared reflective layer is between 1000 and 1100 nm.

(4) An infrared reflective film as described in any one of (1) to (3) above, wherein the transmittance at the center reflective wavelengths of the respective infrared reflective layers is no more than 50% and, furthermore, the reflectance is at least 30%.

(5) An infrared reflective film as described in any one of (1) to (4) above, wherein the infrared reflective layers are formed by the fixing of a cholesteric liquid crystal phase.

(6) A laminated glass formed by interposing an infrared reflective film as described in any one of (1) to (5) above between two sheets of intermediate film, and then laminating these between two sheets of glass.

(7) A laminated glass as described in (6), wherein at least one sheet of intermediate film contains an infrared absorbing agent.

Effects of the Invention

By employing the infrared reflective film of the present invention, it is possible to suppress indoor temperature rise and confer effective heat-shielding performance. Furthermore, since a large number of cholesteric liquid crystal layers is not necessary, the processing stages can be reduced. In addition, it is possible to reduce communication problems by adopting a structure of reflective wavelengths having no effect in the near infrared region comprising 780-950 nm.

MODE OF PRACTICING THE INVENTION

Figure 1:
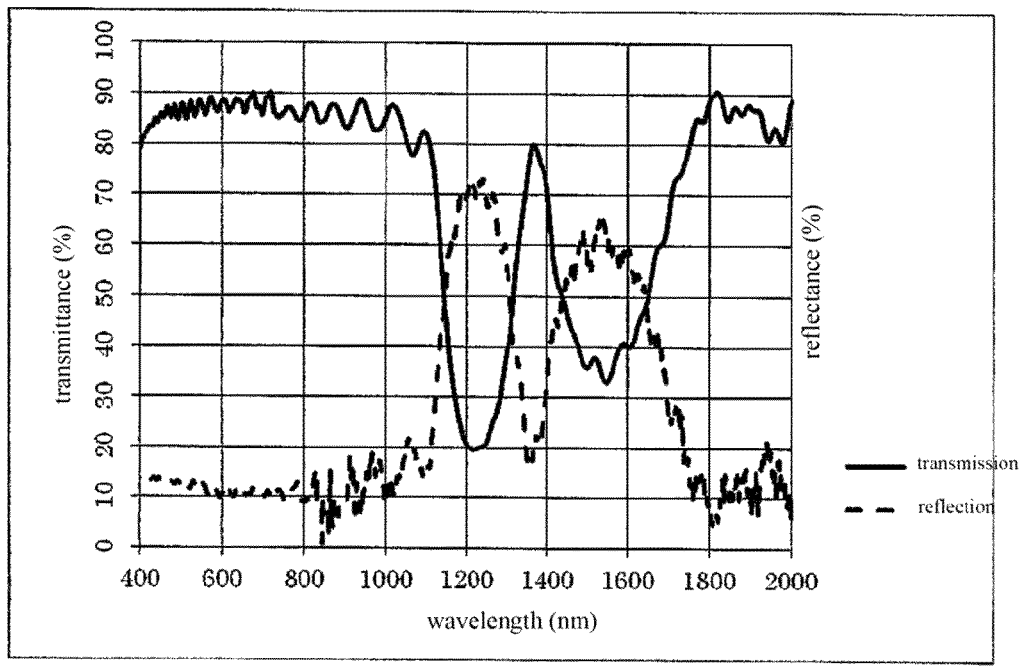
FIG. 1 is the optical spectrum of the infrared reflective film of the present invention obtained in Working Example 1.

The infrared reflective layers employed in the present invention have the function of reflecting light in the so-called infrared region above 780 nm. At least two infrared reflective layers are used in the present invention and a characteristic feature is that, of these layers, the center reflective wavelength of at least one of the infrared reflective layers is between 1200 and 1300 nm. By reflection in this wavelength region, it is possible to markedly enhance the effective heat-shielding effect. Furthermore, by employing an infrared reflective film wherein, of the aforesaid two or more infrared reflective layers, the center reflective wavelength of at least one infrared reflective layer is between 1200 and 1300 nm and, moreover, the center reflective wavelength of at least one infrared reflective layer is between 1500 and 1600 nm, or between 1000 and 1100, a still higher heat-shielding effect is realized, in addition to which there is no effect on the transmission of light in the near infrared region (in the vicinity of 780-950 nm) such that communication problems can be reduced, so this is preferred, and an infrared reflective film wherein, of the aforesaid two or more infrared reflective layers, the center reflective wavelength of at least one infrared reflective layer is between 1200 and 1300 nm and, moreover, the center reflective wavelength of at least one infrared reflective layer is between 1500 and 1600 nm, is still further preferred.

The optical properties at the center reflective wavelengths of the infrared reflective layers employed in the present invention are suitably adjusted in order to obtain the target heat-shielding performance, but it is preferred that the transmittance be no more than 70% and that the reflectance be at least 10%, and it is further preferred that the transmittance be no more than 60% and that the reflectance be at least 20%, while it is still further preferred that the transmittance be no more than 50% and that the reflectance be at least 30%. Moreover, for use at the wavelengths employed for communication, the transmittance is preferably as high as possible, and at least 50%, in the so-called near infrared region in the vicinity of 780-950 nm, with at least 60% further preferred and at least 70% still further preferred.

With regard to the infrared reflective layers employed in the present invention, there are no particular restrictions thereon providing that they permit transmission of visible light and near infrared region radiation over the range from 400 nm up to about 900 nm, and providing that at least one of the infrared reflective layers has an infrared reflective performance such that its center reflective wavelength is between 1200 nm and 1300 nm. Specific examples having these levels of performance include so-called multilayer films where a plurality of thin films of metal oxides with different refractive indexes are superimposed so as to reflect at desired wavelengths; layers comprising a fixed cholesteric liquid crystal phase of helical pitch adjusted so as to achieve a desired selective reflective wavelength, as described in Patent Document 1; fine metal particles with a hexagonal or disk shape as described in JP-A-2011-253094; and multi-layer films comprising a specified polyester and some other polymer as described in Tokuhyō Published Translation of a Foreign PCT Application No. 9-506837, but the use of a cholesteric liquid crystal of high visible light transparency is particular preferred due to ease of setting of the center reflective wavelength.

In the case where a cholesteric liquid crystal is employed for the infrared reflective layer, the direction of the helix is the same direction within a single layer. The theoretical maximum reflectance possible by reflection based on a single helical direction is 50% so, by lamination thereof with a cholesteric liquid crystal having the same reflective wavelength but which is of the other helical direction, it is possible to manifest still higher infrared reflection performance. Specifically, in order that the effects of the present invention are realized to a maximum extent, it is preferred that the infrared reflective film be constructed, for example, by lamination of a total of four layers, comprising a layer formed by fixing a right-handed helical cholesteric liquid crystal phase of center reflective wavelength 1200 nm to 1300 nm plus a left-handed helical cholesteric liquid crystal phase of center reflective wavelength 1200 nm to 1300 nm, and a right-handed helical cholesteric liquid crystal phase of center reflective wavelength 1500 nm to 1600 nm plus a left-handed helical cholesteric liquid crystal phase of center reflective wavelength 1500 nm to 1600 nm.

The cholesteric liquid crystal used in the present invention can be produced by mixing a chiral agent with a material having underlying nematic liquid crystal character. Where the nematic liquid crystal itself has chirality, it can itself orientate at a specific helical pitch as a cholesteric liquid crystal, but the molecular structure thereof has to be designed in order to achieve a desired selective reflective wavelength, so it is much easier to employ a chiral agent in the aforesaid manner and to adjust the amount thereof added. The material having underlying nematic liquid crystal character is, for example, at least one achiral nematic polymerizable monomer possessing polyfunctional- and, in particular, bifunctional-polymerizability. Preferred achiral nematic bifunctionally-polymerizable monomers are those represented by general formula (I)

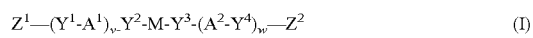

$$Z^1-(Y^1-A^1)_v-Y^2-M-Y^3-(A^2-Y^4)_w-Z^2 \qquad (I)$$

where, in the formula, $Z^1$ and $Z^2$ denote identical or different reactive groups through which polymerization can occur, or groups containing such reactive groups (here the reactive groups are preferably selected from C=C— double and C≡C— triple bonds, the oxirane group, thiirane group, azirane group, cyanate group, thiocyanate group, isocyanate group, carboxylic acid group, hydroxyl group or amino group, and preferably from C=C— double bonds (such as —CH=CH$_2$, —C(CH$_3$)=CH$_2$ or —CH=CH(CH$_3$), with the first two being preferred), $Y^1$, $Y^2$, $Y^3$ and $Y^4$ independently represent a chemical bond, —O—, —S—, —CO—O—, —O—CO—, —O—CO—O—, —CO—S—, —S—CO—, —CO—N(R$^a$)—, —N(R$^a$)—CO—, —N(R$^a$)—CO—O—, —O—CO—N(R$^a$)—, —N(R$^a$)—CO—N(R$^a$)—, —CH$_2$—O— or —O—CH$_2$—, preferably —CO—O—, —O—CO— or —O—CO—O— (where R$^a$ represents hydrogen or a C$_{1-4}$ alkyl group), $A^1$ and $A^2$ are identical or different spacers selected from straight-chain C$_{2-30}$ alkylene groups, preferably C$_{2-12}$ alkylene groups within which oxygen, sulfur and/or optionally mono-substituted nitrogen may be interposed (but where such interposed groups are not next to each other, and where suitable amine substituents include C$_{1-4}$ alkyl groups and the alkyl groups may be substituted with fluorine, chlorine or bromine, or with cyano, methyl or ethyl groups), and $A^1$ and $A^2$ particularly preferably both represent —$(CH_2)_n$— (where n=2 to 6), v and w each independently denote 0, 1 or 2, M denotes a mesogenic group, and preferably one conforming to general formula (II)

$$(T^1-Y^5)_y-T^2 \quad (II)$$

where, in the formula, $T^1$ independently represents a divalent alicyclic saturated group or partially-unsaturated heterocyclic group, aromatic group, or heteroaromatic group, $T^2$ independently has the same definition as $T^1$, each $Y^5$ may be an identical or different bridging structure —CO—O—, —O—CO—, —CH$_2$—O—, —O—CH$_2$—, —CO—S—, —S—CO—, —CH$_2$—S—, —S—CH$_2$—, —CH=N—, —N=CH—, —CH=N—N=CH—, —C≡C—, —CH=CH—, —C(CH$_3$)=CH—, —CH=C(CH$_3$)— or direct chemical linkage, and preferably —CHO— or —O—CO—, y is an integer in the range 0 to 3, preferably 0, 1 or 2, especially 1 or 2 and, in particular, 2.

Preferably, $T^2$ represents an aromatic group, with a phenyl group being especially preferred. In particular, $T^2$ represents a group represented by the following formula (1)

Chem. 1

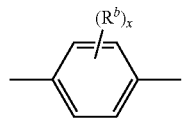

(1)

where, in the formula, $R^b$ represents fluorine, chlorine, bromine, a $C_{1-20}$ alkyl group, $C_{1-10}$ alkoxy group, $C_{1-10}$ alkylcarbonyl group, $C_{1-10}$ alkylcarbonyloxy group, $C_{1-10}$ alkoxycarbonyl group, hydroxyl group, nitro group, CHO or CN, preferably chlorine, bromine, a $C_{1-4}$ alkyl group or a $C_{1-4}$ alkoxycarbonyl group, in particular methyl or methoxycarbonyl, and x is 0, 1, 2, 3 or 4, preferably 0, 1 or 2, more preferably 0 or 1 and, in particular, 1.

In regard to $T^1$, it is preferred that each be independently an aromatic group, especially a phenyl group or naphthyl group and, in particular, a phenyl group with 1,4-bonding or a naphthyl group with 2,6-bonding.

$Y^5$ preferably represents —CO—O— or —O—CO—.

y preferably represents 2.

Particularly preferred mesogenic groups M are selected from those of structural formula (2)

Chem. 2

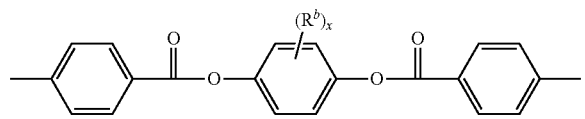

(2)

where, in the formula, $R^b$ and x each have any of the general or preferred meanings given above and, in particular, $R^b$ represents the methyl group and x represents 1, or from those of structural formula (3)

Chem. 3

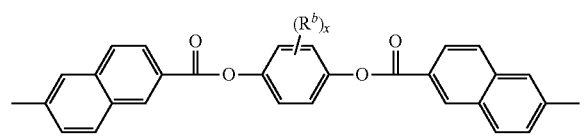

(3)

where, in the formula, $R^b$ and x each have any of the general or preferred meanings given above and, in particular, $R^b$ represents the methoxycarbonyl group and x represents 1.

In an especially preferred embodiment, the achiral nematic difunctionally-polymerizable monomer is selected from the compounds I.a and I.b shown in (4) below Chem. 4

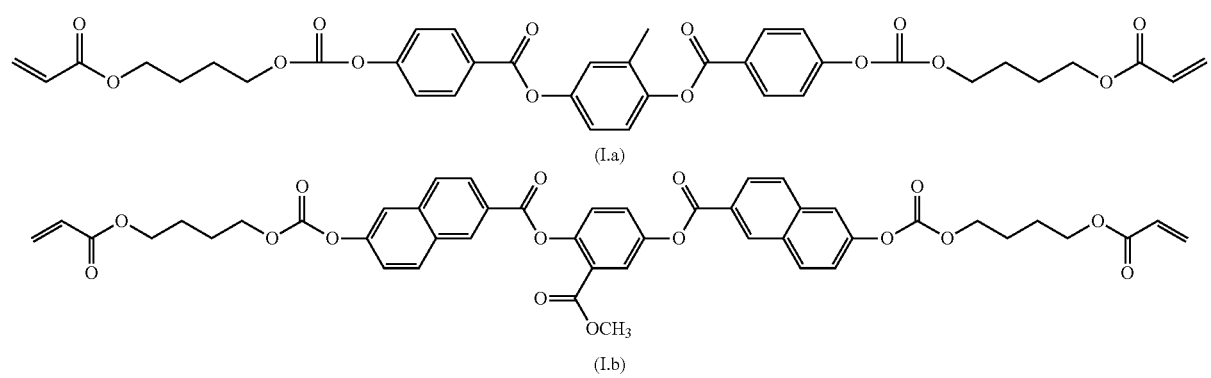

(4)

or it is a mixture thereof.

The achiral nematic polymerizable monomer may also include monofunctionally-polymerizable achiral nematic monomer. This preferably has the general formula (IIIa) and/or (IIIb), $$A^3-Y^2-M-Y^3-(A^2-Y^4)_w-Z^2 \quad (IIIa)$$

$$Z^1-(Y^1-A^1)_v-Y^2-M-Y^3-A^3 \quad (IIIb)$$

where, in these formulae, $Z^1$, $A^1$, $Y^1$, $Y^2$, $Y^3$, $Y^4$, v, w and M each independently have any of the general or preferred meanings described in relation to formula (I), and $A^3$ either represents a straight-chain $C_{1-30}$ alkyl group, and preferably a straight-chain $C_{1-12}$ alkyl group in which oxygen, sulfur and/or optionally mono-substituted nitrogen may be interposed (but where such interposed groups are not next to each other, and where suitable amine substituents include $C_{1-4}$ alkyl groups, and the alkyl groups may be substituted with fluorine, chlorine or bromine, or with cyano, methyl or ethyl groups), or it represents CN or —N=C=S.

$A^3$ preferably represents a straight-chain $C_{2-8}$ alkyl group or CN, in particular a straight-chain $C_{4-8}$ alkyl group or CN.

$Y^1$, $Y^2$, $Y^3$ and $Y^4$ preferably each independently represent —O—CO—, —CO—O—, —O—CO—O— or a C—C— triple bond.

$Z^1$ preferably represent a C—C— double bond (advantageously —CH=CH$_2$ or —C(CH$_3$)=CH$_2$).

M preferably represents a mesogenic group of general formula (II). In such circumstances, $T^1$ and $T^2$ each independently represents an aromatic group, especially a phenyl group or a naphthyl group supporting 0, 1, 2, 3 or 4 groups $R^b$ (where $R^b$ has any of the general or preferred meanings given above), in particular a 1,4-bonded phenyl group or 2,6-bonded naphthyl group supporting 0, 1, 2, 3 or 4 groups $R^b$ (where $R^b$ has any of the general or preferred meanings given above), with an unsubstituted 1,4-bonded phenyl group or an unsubstituted 2,6-bonded naphthyl group being especially preferred. In such a case, y preferably denotes 0 or 1.

Particularly preferred monofunctionally-polymerizable achiral nematic monomers are selected from the following structural formulae (5) to (7).

Chem. 5

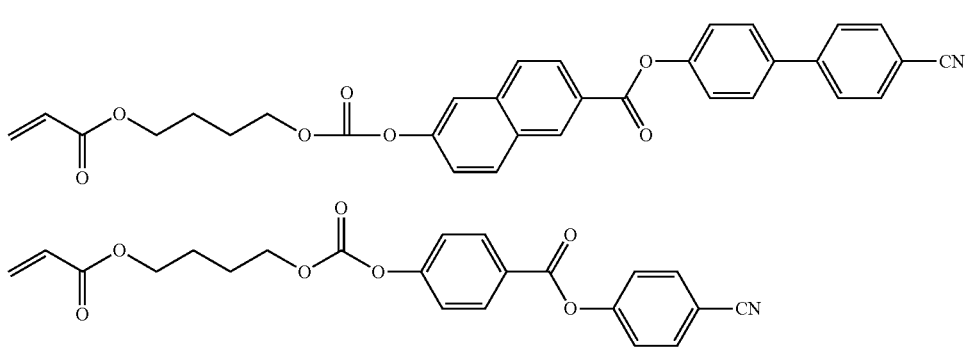

(5)

Chem. 6

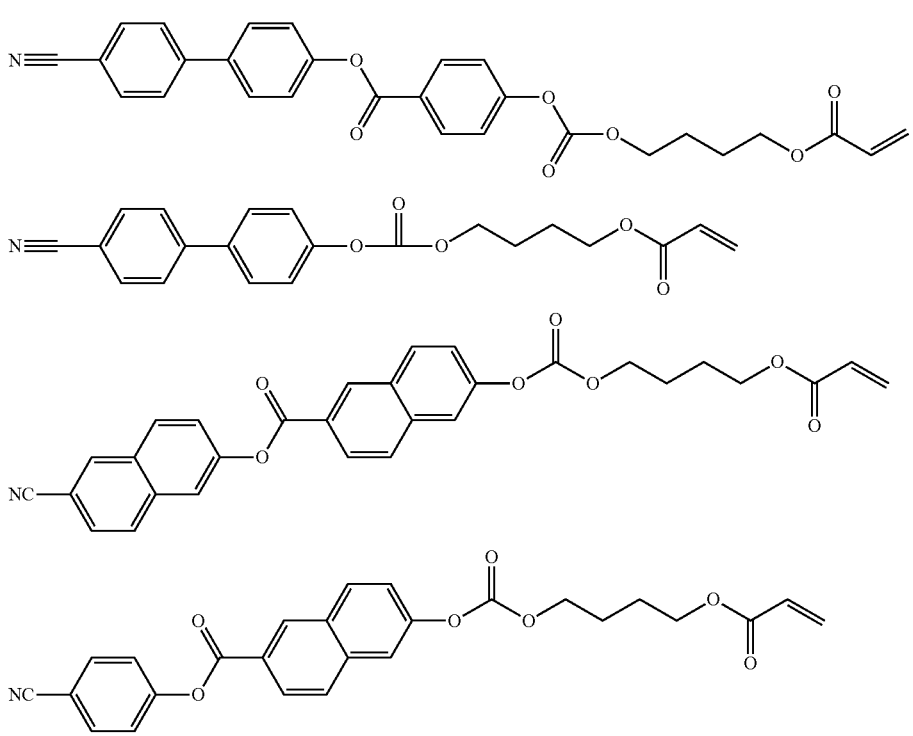

(6)

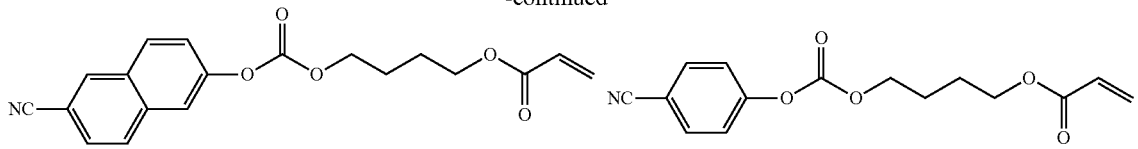

Chem. 7

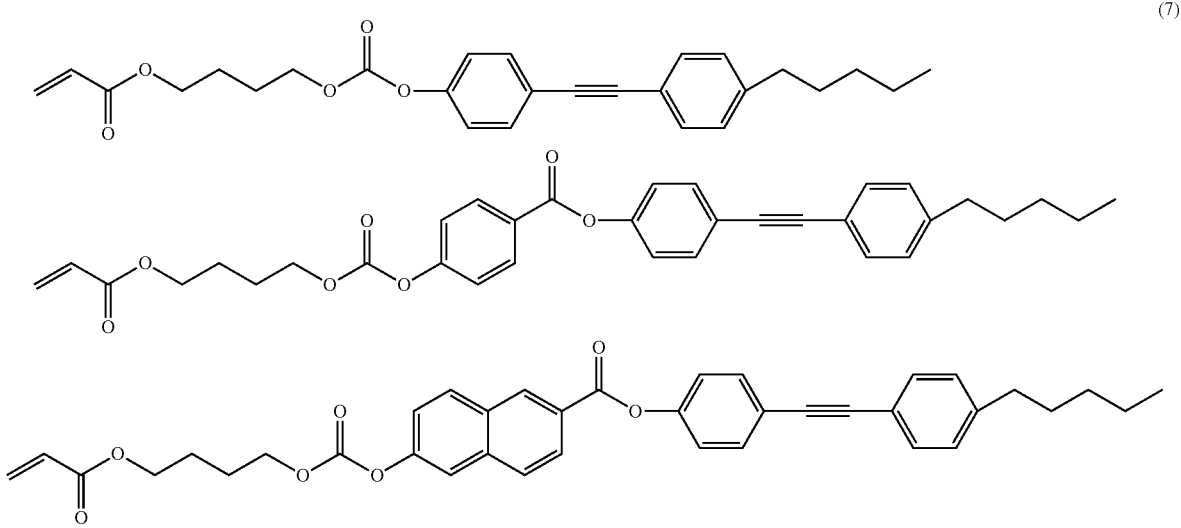

(7)

The at least one achiral nematic polymerizable monomer preferably includes (i) at least one difunctionally-polymerizable achiral nematic monomer of general formula (I), and preferably one or two difunctionally-polymerizable achiral nematic monomers of general formula (I); and (ii) optionally, at least one monofunctionally-polymerizable achiral nematic monomer of formula (IIIa) and/or (IIIb).

With regard to suitable commercially-available achiral nematic polymerizable monomers, there may be used, for example, Paliocolor® LC242, or Paliocolor® LC1057.

If the composition includes one or more monofunctionally-polymerizable monomers, the total amount thereof in the composition, in terms of the total of polyfunctionally- and monofunctionally-polymerizable achiral nematic monomers, is preferably no more than 40 mass %, more preferably no more than 20 mass %, particularly no more than 10 mass %, and especially no more than 5 mass % of the total.

In a specific practical embodiment, there is no monofunctionally-polymerizable achiral nematic monomer present, and there is just included at least one, and preferably one or two polyfunctionally-, in particular difunctionally-polymerizable achiral nematic monomers.

The chiral agent is preferably of formula (IV),

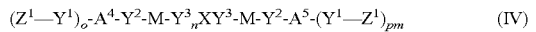   (IV)

where, in the formula, $Z^1$, $Y^1$, $Y^2$, $Y^3$ and M have any of the general or preferred meanings given in relation to formula (I), o and p each represent 0 or 1 (but o and p cannot here both denote 0 at the same time), $A^4$ and $A^5$ may both be the same or different and, in the case where o=1, $A^4$ has the same definition as $A^1$, whereas, when o=0, it represents a straight-chain $C_{1-30}$ alkyl group, preferably a straight-chain $C_{1-12}$ alkyl group in which oxygen, sulfur and/or optionally mono-substituted nitrogen may be interposed (but where such interposed groups are not next to each other, and where suitable amine substituents include $C_{1-4}$ alkyl groups and where the alkyl groups may be substituted with fluorine, chlorine or bromine, or with cyano, methyl or ethyl groups), and it is particularly preferred in such circumstances that $A^4$ represents a $CH_3(CH_2)_l$— group where l=1 to 7, $A^5$ is defined in the same way as $A^1$ in formula (I) above in the case where p=1, whereas in the case where p=0 it represents a straight-chain $C_{1-30}$ alkyl group, preferably a straight-chain $C_{1-12}$ alkyl group in which oxygen, sulfur and/or optionally mono-substituted nitrogen may be interposed (but where such interposed groups are not next to each other, and where suitable amine substituents include $C_{1-4}$ alkyl groups where the alkyl groups may be substituted with fluorine, chlorine or bromine, or with cyano, methyl or ethyl groups), and it is particularly preferred in such circumstances that $A^5$ represents a $CH_3(CH_2)_l$— group where l=1 to 7, n and m represent 0, 1 or 2 (where the sum of n+m equals 1 or 2, and preferably equals 2), and X is a chiral group.

Mesogenic group M is preferably represented by formula (II)

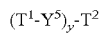
(II)

where, in the formula, $T^1$, $T^2$ and $Y^5$ have any of the general or preferred meanings given above. y has any of the general meanings given above, but it preferably denotes 0 or 1.

$T^2$ is preferably an aromatic group, with a phenyl group being particularly preferred. In particular, $T^2$ represents a group of formula (8)

Chem. 8

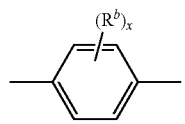
(8)

where, in the formula, $R^b$ represents fluorine, chlorine, bromine, a $C_{1-20}$ alkyl group, $C_{1-10}$ alkoxy group, $C_{1-10}$ alkylcarbonyl group, $C_{1-10}$ alkylcarbonyloxy group, $C_{1-10}$ alkoxycarbonyl group, hydroxyl group, nitro group, CHO or CN, preferably chlorine, bromine, a $C_{1-4}$ alkyl group or $C_{1-4}$ alkoxycarbonyl group and, in particular, methyl or methoxycarbonyl, and x is 0, 1, 2, 3 or 4, preferably 0, 1 or 2, more preferably 0 or 1, and, in particular, 0.

In regard to $T^1$, it is preferred that each be independently an aromatic group, more preferably a phenyl group or a naphthyl group and, in particular, a phenyl group with 1,4-bonding or a naphthyl group with 2,6-bonding, especially an unsubstituted 1,4-bonded phenyl group or unsubstituted 2,6-bonded naphthyl group.

$Y^5$ preferably represents —CO—O— or —O—CO—.

y preferably represents 0 or 1.

With regard to the chiral group X in the compounds of general formula (IV), in terms of comparative ready-availability, a group derived from, in particular, a sugar, a dinaphthyl- or diphenyl-derivative, or an optically-active glycol, alcohol or amino acid, is preferred. In the case of the sugar, examples thereof include pentose and hexose, as well as derivatives derived therefrom.

Examples of group X have the structures shown below, where the terminal lines in formulae (9) and (10) in each case denote a free valency.

Chem. 9

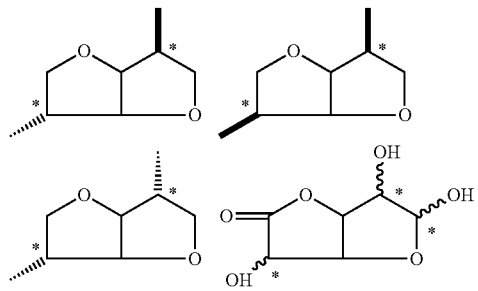
(9)

-continued

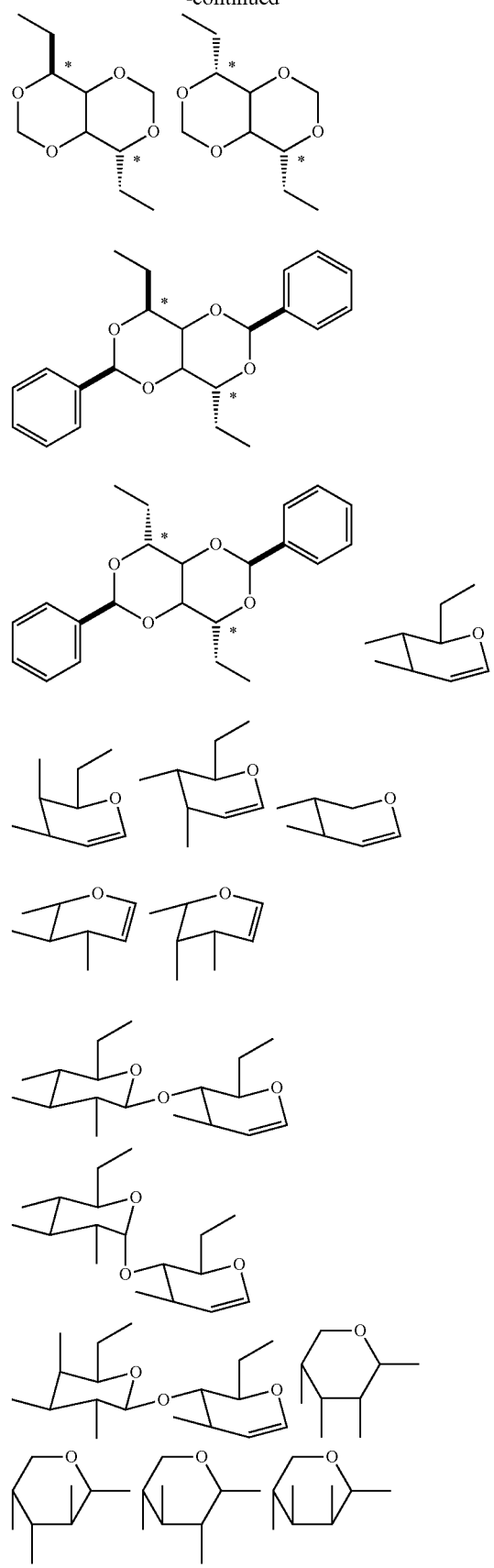

Chem. 10
(10)
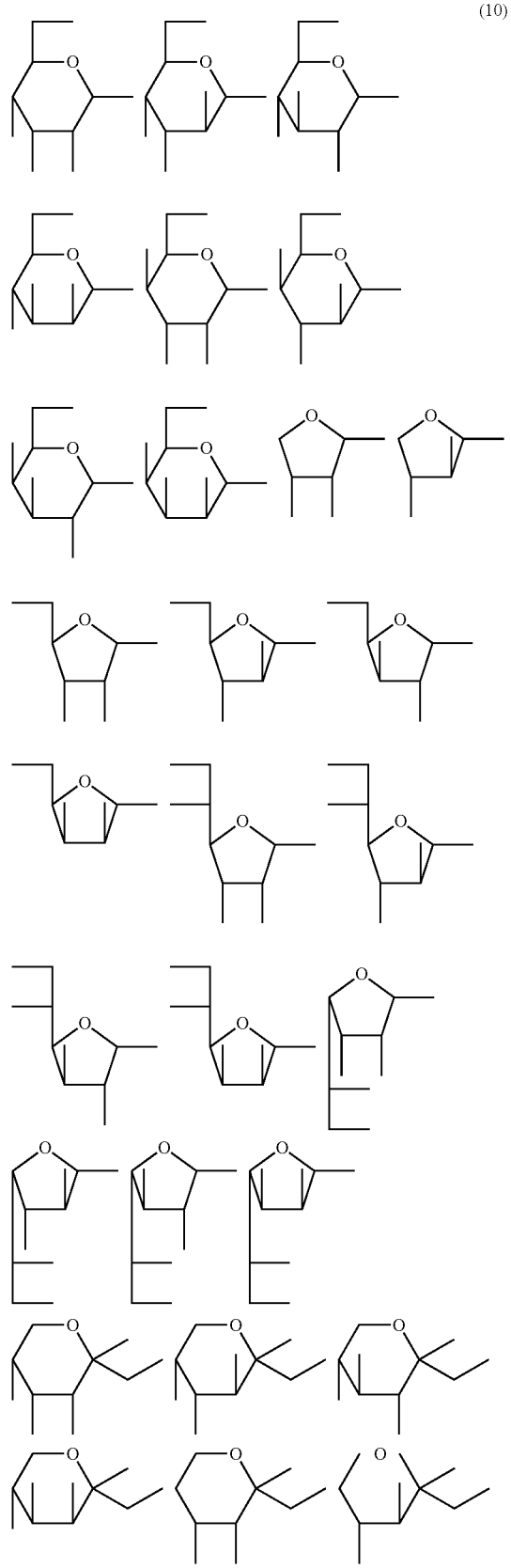
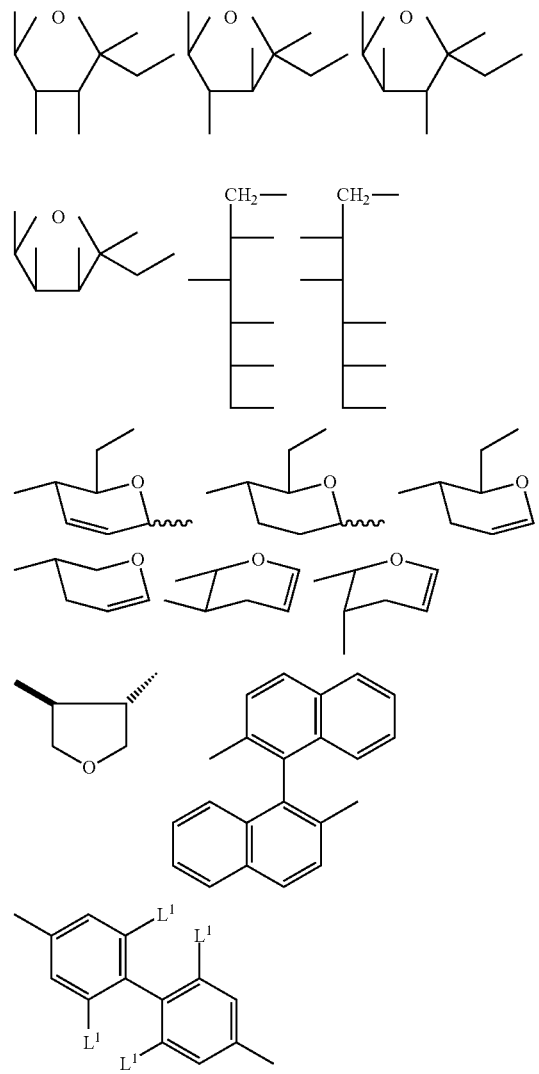
In these formulae, $L^1$ means a $C_{1-4}$ alkyl group, $C_{1-4}$ alkoxy group, halogen, $COOR^e$, $OCOR^e$ or $NHCOR^e$, where $R^e$ represents a $C_{1-4}$ alkyl group or hydrogen.
Particularly preferred groups X are the following.
Chem. 11
(11)
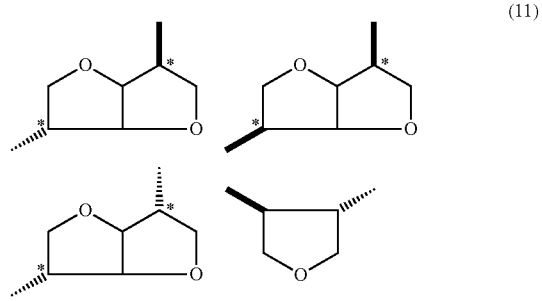
Moreover, chiral groups having the following structures are also suitable.

Chem. 12
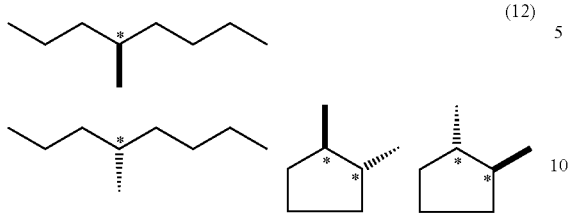
(12)
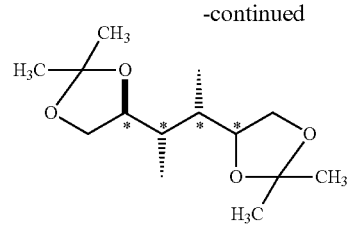
In a particularly preferred embodiment, the chiral polymerizable compound is selected from the following structural formulae.
Chem. 13
IV.a
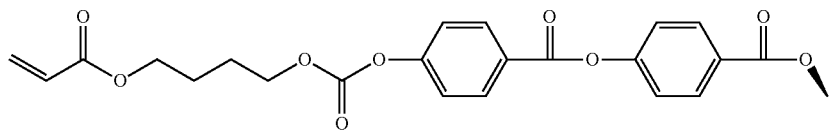
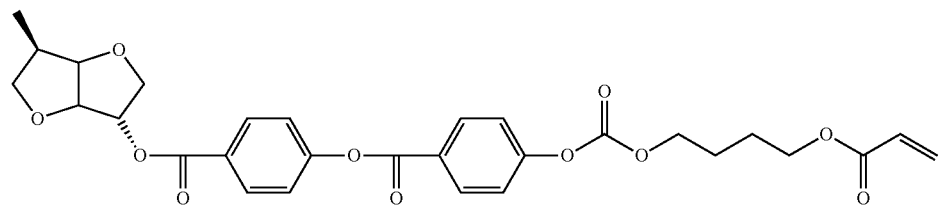
IV.b
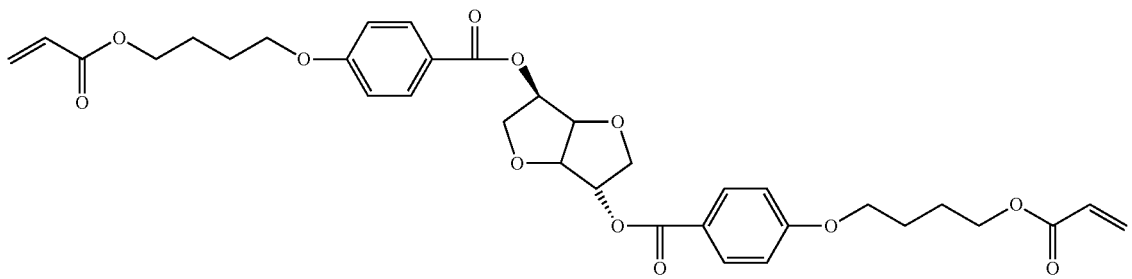
IV.c
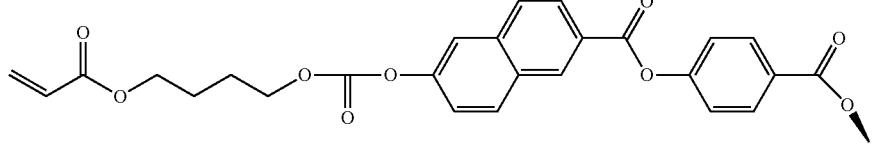
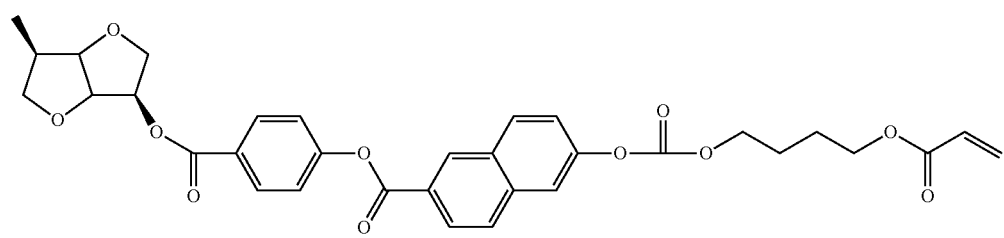

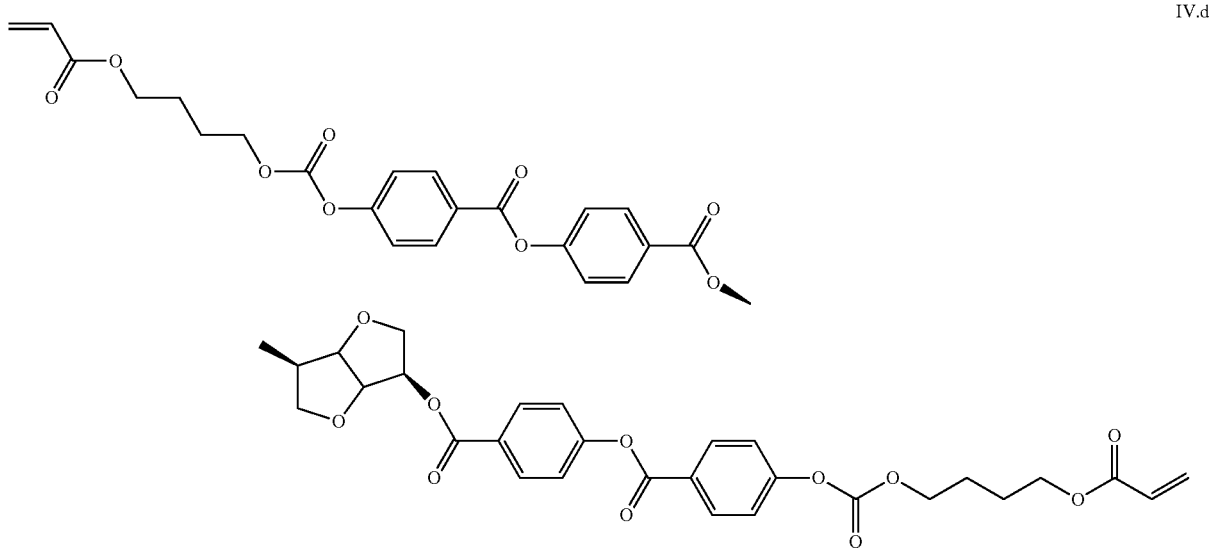

IV.d

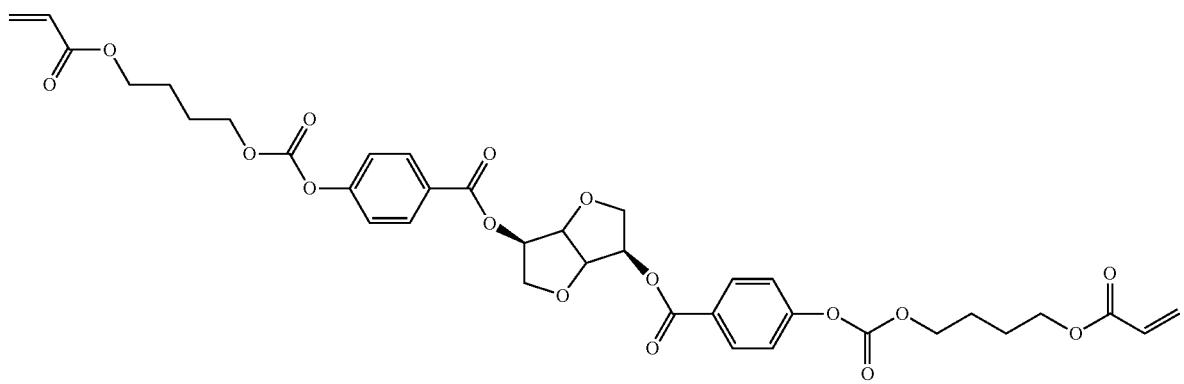

IV.e

Of these, the compounds of formulae IV.a, IV.b and IV.c are preferred, with those of formulae IV.a and IV.c being particularly preferred. The compounds of formula IV.c are especially preferred. At least one of the liquid crystal layers in the film of the present invention is preferably constructed from a composition employing compound IV.c as a chiral polymerizable compound.

Examples of suitable commercially-available chiral polymerizable compounds are Paliocolor® LC756 and Paliocolor® LC1080.

Examples of the photoinitiators are isobutyl benzoin ether, 2,4,6-trimethylbenzoyldiphenyl-phosphine oxide, 1-hydroxycyclohexyl phenyl ketone, 2-benzyl-2-dimethyl-amino-1-(4-morpholinophenyl)furan-1-one, mixtures of benzophenone and 1-hydroxycyclohexyl phenyl ketone, 2,2-dimethoxy-2-phenylacetophenone, perfluorodiphenyltitanocene, 2-methyl-1-(4-methylthio-phenyl)-2-(4-morpholinyl)-1-propanone, 2-hydroxy-2-methyl-1-phenylpropan-1-one, 4-(2-hydroxyethoxy)phenyl 2-hydroxy-2-propyl ketone, 2,2-diethoxyacetophenone, 4-benzoyl-4'-methyldiphenyl sulfide, ethyl 4-(dimethylamino)benzoate, mixtures of 2-isopropylthioxanthone and 4-isopropylthioxanthone, 2-(dimethylamino)ethyl benzoate, d,l-camphorquinone, ethyl-d,l-camphorquinone, mixtures of benzophenone and 4-methylbenzophenone, benzophenone, 4,4'-bis(dimethyl-amine)benzophenone, ($\eta^5$-cyclopentadienyl) ($\eta^6$-isopropyl-phenyl)iron(II)-hexafluorophosphate, triphenylsulfonium hexafluorophosphate, and triphenylsulfonium salt mixtures.

Examples of suitable commercially-available photoinitiators are those marketed under the commercial names Lucirin®, Irgacure® and Darocur®. Preferably, as the initiator, there is used Lucirin® TPO, Lucirin® TPO-L, Irgacure® OXE 01, Irgacure® OXE 02, Irgacure® 1300, Irgacure® 184, Irgacure® 369, Irgacure® 379, Irgacure® 819, Irgacure® 127, Irgacure® 907 or Darocur® 1173, with Lucirin® TPO, Lucirin® TPO-L, Irgacure® OXE 01, Irgacure® OXE 02, Irgacure® 1300 or Irgacure® 907 being particularly preferred.

The photoinitiators are normally employed at a proportion lying between about 0.1 and 10.0 mass % in terms of the total mass of the liquid crystal mixture. In particular, in the case where hardening is carried out under an inert gas atmosphere, it is possible to employ a particularly low amount of the photoinitiator. In such a case, the photoinitiator is used at a proportion lying between about 0.1 to 5.0 mass %, and preferably between 0.2 and 3.0 mass %, in terms of the total mass of the liquid crystal mixture. In the case where the hardening is conducted in air, a proportion lying between about 1.0 and 10.0 mass % is employed.

As an example of the method for producing the infrared reflective layer using an aforesaid cholesteric liquid crystal, there is first added to the polymerizable liquid crystal material the amount of chiral agent required to manifest the desired selective reflective wavelength. Next, these are dissolved in a solvent, and the photoinitiator added. Thereafter, the solution is coated onto a plastic substrate sheet of PET film or the like, in such a way that the coating thickness is as uniform as possible, and then this is left for a fixed time under temperature conditions such that, while the solvent is eliminated by the heating, the photopolymerizable liquid crystal on the substrate sheet forms a cholesteric liquid crystal and there is orientation at the desired helical pitch. It is possible to achieve still more uniform orientation of the cholesteric liquid crystal at this time by subjecting the surface of the plastic film to an orientation treatment such as rubbing or stretching, etc., prior to the coating, and it is possible in this way to lower the haze value as a film. Next, while still maintaining this oriented state, fixing of the orientation is carried out by irradiation with ultraviolet light using a high pressure mercury lamp, or the like, and there is thus obtained a film on which is formed the infrared reflective layer used in the present invention.

Next, following the same procedure as above, a film having the same reflective wavelength as the above but of different helical direction, and also right-handed and left-handed helical films with a different center reflective wavelength, are respectively formed. By performing lamination using these four types of film, it is possible to obtain the infrared reflective layers employed in the present invention. The lamination method is not particularly restricted but, for example, two types of laminate film may be produced by respectively sticking together pairs of the films using a pressure-sensitive adhesive or an adhesive agent. Then, by sticking together the films thereby obtained using a pressure-sensitive adhesive or an adhesive agent, it is possible to obtain the inventive infrared reflective film, where four layers have been laminated. While the case described above is one where there are four infrared reflective layers, there will be at least two infrared reflective layers in the infrared reflective film of the present invention, of which the center reflective wavelength of one should be between 1200 and 1300 nm, and more preferably the center reflective wavelength of another of the infrared reflective layers should be between 1500 and 1600 nm, or between 1000 and 1100 nm. The number of superimposed layers is preferably between 2 and 12 layers, more preferably between 2 and 10 layers, and still more preferably between 2 and 8 layers, but between 2 and 4 layers is ideal in terms of keeping the number of cholesteric liquid crystal layers from which the infrared reflective film is composed as low as possible and thereby reducing the number of processing stages. The number of superimposed layers may be an even number or an odd number.

In the case where the fixed cholesteric liquid crystal phase can be peeled away from the plastic substrate sheet, it is possible to obtain the infrared reflective film of the present invention with four superimposed layers but without containing plastic substrate in the middle, by employing the two-layer superimposed states and sticking these together with a pressure-sensitive adhesive or an adhesive agent after peeling away one of the plastic substrates from the outsides of each. Examples of the pressure-sensitive adhesive are acrylic and rubber-based pressure-sensitive adhesives, but an acrylic pressure-sensitive adhesive is preferred in terms of being able to adjust the adhesive property and holding power, etc. Examples of the adhesive agent are ultraviolet-curable resin compositions and thermosetting resin compositions. In the case of an ultraviolet-curable resin, adhesion can be performed using a composition comprising a plurality of monomers containing acryloyl or epoxy groups, with curing being effected by irradiating with ultraviolet light in the presence of a photoinitiator. In the case of a thermosetting resin, adhesion can be performed by heating a composition comprising a plurality of monomers having epoxy groups in the presence of an acid catalyst, to bring about curing. Alternatively, adhesion can be performed by heating a composition comprising a plurality of monomers or polymers with amino, carboxyl or hydroxyl groups, in the presence of a compound having isocyanate The plastic substrate sheet remaining on both sides can be used as it is in the subsequently-conducted laminated glass formation process or, in the case where it can be peeled away, it can act as a protective film up to the point when it is peeled off during the laminated glass formation process.

The infrared reflective film of the present invention obtained in this way can suppress a rise in temperature within the rooms of a building by being affixed to the window glass, or the like, using a pressure-sensitive adhesive or an adhesive agent, and it can also be suitably employed for effectively suppressing a rise in temperature within vehicles such as cars, while not being susceptible to damage from outside, by arranging it within the laminated glass employed in the car.

Next, explanation is provided of the method of producing laminated glass using the inventive infrared reflective film. First of all two glass sheets are prepared. In the case where used as the laminated glass for the windscreen of a motor vehicle, soda-lime glass produced by the float glass method is employed. In terms of the thickness of such glass sheet, normally about 2 mm t material is used but recently, for the purposes of weight reduction, it has been possible to employ a slightly thinner glass. After cutting the glass sheets to the specified shape, the glass edges are chamfered and washing performed. In the case where black-colored frame- or dot-shaped printing is required, the printing thereof is carried out. Where a curved surface shape is required, such as for a windscreen, the glass sheets are heated to at least 650° C., after which the two sheets are molded to the same surface shape by pressing using a mold, or by bending or the like under their own weight, after which the glass is cooled. If the rate of cooling at this time is too rapid, stress distribution is produced in the glass sheet and tempered glass is formed, so the cooling is carried out by slow cooling. One of the glass sheets produced in this way is placed horizontally and then, on top thereof, an intermediate film, the infrared reflective film, and an intermediate film are superimposed in turn, and finally the remaining glass sheet is placed thereon. Any intermediate film or infrared reflective film projecting out from the edges of the glass is cut away with a cutter. Next, heating is carried out to a temperature of from 80° C. to 100° C. while performing deaeration of the air present between the glass, intermediate film and infrared reflective film superimposed in sandwich fashion in this way, and preliminary bonding carried out. There are two methods for performing the deaeration, namely the bag method which is carried out by wrapping the laminate of glass/intermediate film/infrared reflective film in a rubber bag made of heat-resistant rubber, or the like, and the ring method where only the edges of the glass are sealed by covering with a rubber ring, and either of these may be used. Following the end of the preliminary bonding, the glass/intermediate film/infrared reflective film laminate which has been removed from the rubber bag, or the laminate from which the rubber ring has been removed, is introduced into an autoclave, and therein heated to 120-150° C. under a high pressure of between 980 and 1470 kPa, and the heating and pressurizing treatment carried out for between 20 and 40 minutes under these conditions. Following the treatment, cooling is performed to 50° C. or below, after which the pressure is released and the laminated glass with an inserted infrared reflective film is removed from the autoclave.

A polyvinyl butyral resin (PVB) or an ethylene-vinyl acetate copolymer resin (EVA) can be used for the intermediate film. These are widely employed as intermediate films for laminated glass, so are preferred, and there are no particular restrictions providing that the product quality as a laminated glass can be adjusted according to the needs. Furthermore, ultraviolet absorbers, antioxidants, antistatic agents, heat stabilizers, colorants, and adhesion regulators may also be suitably incorporated therein. In particular, the dispersing in the intermediate film of fine particles which absorb infrared is preferred in terms of producing a high-performance heat-shielding laminated glass. Examples of fine particles which absorb infrared are ultrafine particles of the metals, metal oxides and nitrides of Sn, Ti, Zn, Fe, Al, Co, Ce, Cs, In, Ni, Ag, Cu, Pt, Mn, Ta, W, V, and Mo, or these individual materials doped with Sb or F, and also complexes containing two or more of these, or other materials having electrical conductivity. In particular, tin-doped indium oxide (ITO), antimony-doped tin oxide (ATO) and fluorine-doped tin oxide, which are transparent in the visible light region, are particularly preferred for use in the case of the windows for buildings or motor cars, where transparency is especially demanded. The diameter of the infrared-absorbing fine particles dispersed in the intermediate film is preferably no more than 0.2 μm. At this size, infrared can be absorbed while the scatter of light in the visible region is suppressed, so no haze is produced, and it is possible to maintain properties such as the adhesion properties, transparency and durability, etc., at the same levels as in the case of an intermediate film where no such addition has been made, while, at the same time, securing radio wave transmission and transparency, in addition to which the laminated glass can be formed on an ordinary laminated glass production line. In the case where PVB is used as the intermediate film, the forming of the laminated glass is carried out in a room of constant temperature and humidity in order to maintain the moisture content of the intermediate film at the optimum level. Furthermore, it is also possible to employ intermediate film where part is colored, where there is sandwiched a layer with a sound-insulating function, or where there is a slope in thickness, etc.

In addition to ordinary motor vehicles, compact vehicles and light vehicles, etc., the laminated glass of the present invention can also be employed as the windscreen, side glass, rear glass, or roof glass for large-size special vehicles and compact special vehicles. Furthermore, it can be used for the windows of railway carriages, boats, and aircraft, and as a glazing material for building and industrial use. According to the mode of use, it can be laminated or affixed to components having a UV screening or light modulating function.

By, for example, use as the windscreen of a car or the like, the laminated glass obtained in this way can suppress a rise in temperature inside the car and enhance the sense of comfort.

What has been described above merely illustrates one example of the embodiments of the present invention, and various modifications can be included within the scope of the claims.

WORKING EXAMPLES

Below, the present invention is described in more detail by means of working examples. The term 'parts' employed as units for the amounts given in the formulations in the tables shown below means parts by weight.

Preparation of the Coating Solutions (Liquid Crystal Compositions)

Coating solutions (R1) and (L1) having the compositions shown in the tables below were respectively prepared.

TABLE 1

Composition of coating solution (R1)

| Material (type) | Material Name | Amount (parts) |
| --- | --- | --- |
| achiral nematic monomer | compound (I.a) | 10.00 |
| chiral agent | compound (IV.a) | 0.27 |
| photo initiator | Lucirin ® TPO | 0.51 |
| solvent | cyclopentanone | 26.00 |

TABLE 2

Composition of coating solution (L1)

| Material (type) | Material Name | Amount (parts) |
| --- | --- | --- |
| achiral nematic monomer | compound (I.a) | 10.00 |
| chiral agent | compound (IV.c) | 0.71 |
| photo initiator | Lucirin ® TPO | 0.51 |
| solvent | cyclopentanone | 27.00 |

Next, coating solutions (R2), (R3), and (R4) were prepared based on the same formulation as for coating solution (R1), except that the amount of chiral agent compound (IV.a) in the formulation was changed to that shown in the following table.

TABLE 3

| Coating solution | Amount of Compound (IV.a) in the Formulation (parts) |
| --- | --- |
| coating solution (R2) | 0.20 |
| coating solution (R3) | 0.36 |
| coating solution (R4) | 0.32 |

Furthermore, coating solutions (L2), (L3), and (L4) were prepared based on the same formulation as for coating solution (L1), except that the amount of chiral agent compound (IV.c) in the formulation was changed to that shown in the following table.

TABLE 4

| Coating solution | Amount of Compound (IV.c) in the Formulation (parts) |
| --- | --- |
| coating solution (L2) | 0.49 |
| coating solution (L3) | 0.91 |
| coating solution (L4) | 0.79 |

Working Example 1

Using the prepared coating solutions (R1), (L1), (R2) and (L2), infrared reflective layers were respectively formed by the following procedure, then these laminated and the infrared reflective film of the present invention obtained. PET film (with no undercoat layer), produced by the Toyobo Co., was employed as the plastic substrate sheet.

(1) Each of the coating solutions was applied at room temperature onto PET film using a wire bar, to give a coating thickness after drying of 4 μm.

(2) By heating for 5 minutes at 150° C., as well as eliminating the solvent a cholesteric liquid crystal phase was formed. Next, irradiation with UV was performed for 5-10 seconds using a high pressure mercury lamp (manufactured by the Harison-Toshiba Lighting Co.) at an output of 120 W, so that the cholesteric liquid crystal phase was fixed and an infrared reflective layer obtained.

(3) The infrared reflective layer sides of (R1) and (L1), produced by means of (1) and (2), were laminated together using an acrylic pressure-sensitive adhesive.

(4) The infrared reflective layer sides of (R2) and (L2), produced by means of (1) and (2), were laminated together in the same way as in (3).

(5) The PET film was peeled away from just one side of each of the laminates from (3) and (4), and then the infrared reflective layers of each were laminated together using an acrylic pressure-sensitive adhesive.

The optical properties of the infrared reflective film of the present invention thus obtained were as shown in FIG. 1. With regard to the center reflective wavelengths, the center reflective wavelength in the case where (R1) and (L1) were used was about 1210 nm, and the center reflective wavelength in the case where (R2) and (L2) were used was about 1530 nm. Furthermore, the solar heat gain coefficient ($T_{TS}$) of the inventive infrared reflective film was calculated based on JIS R3106. $T_{TS}$ was 79%.

Working Example 2

Transparent glass sheet of thickness 2 mm and green colored glass sheet of the same thickness were cut to size 300 mm×300 mm. Additionally, a transparent PVB intermediate film of thickness 0.38 mm, an infrared absorbing type PVB intermediate film of thickness 0.76 mm, and an infrared reflective film produced in the same way as in Working Example 1 were respectively prepared. The infrared absorbing type PVB intermediate film comprised fine ITO particles uniformly dispersed in a PVB intermediate film. On top of the green colored glass sheet were superimposed the infrared absorbing type PVB intermediate film, the infrared reflective film with the PET film peeled away from both faces, the transparent PVB intermediate film, and the transparent glass film. The surplus regions of PVB intermediate film and infrared reflective film projecting out from the edges of the glass sheets were cut away. After wrapping in a rubber bag, deaeration was carried out for 10 minutes in an autoclave heated to 90° C., and preliminary adhesion effected. After cooling to room temperature and removing from the rubber bag, further heating was then carried out for 30 minutes in an autoclave at 135° C. under a high pressure of 12 kg/cm², and there was produced a laminated glass of good appearance in which an infrared reflective film had been inserted. The visible light transmittance of the obtained inventive laminated glass with an infrared reflective film inserted was 75%. When the reflection characteristics were measured in the same way, there was a near infrared reflective function exhibiting center reflective wavelengths at two wavelengths, namely about 1210 nm and about 1530 nm. Moreover, $T_{TS}$ for this inventive laminated glass with an infrared reflective film inserted was 54%.

Working Example 3

Using prepared coating solutions (R1), (L1), (R4) and (L4), infrared reflective layers were respectively produced by the same procedure as in Working Example 1, then these laminated together, and an infrared reflective film comprising a total of four layers produced.

Figure 2:
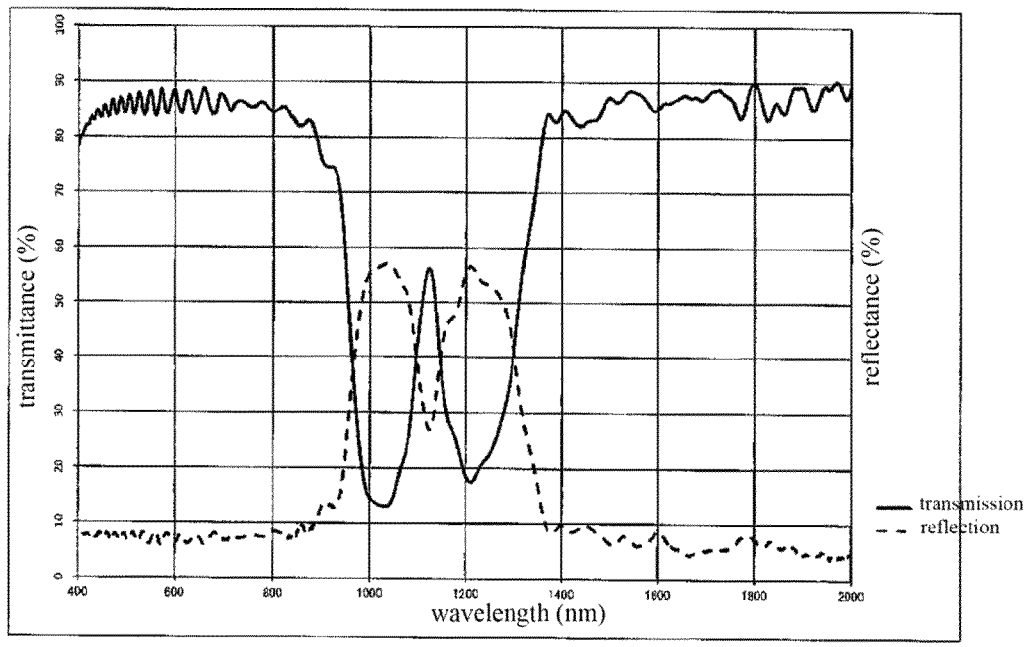
FIG. 2 is the optical spectrum of the infrared reflective film obtained in Working Example 2.

The optical characteristics of the infrared reflective film obtained were as shown in FIG. 2. With regard to the center reflective wavelengths, where (R4) and (L4) were employed the center reflective wavelength was about 1020 nm, and where (R1) and (L1) were used the center reflective wavelength was about 1210 nm. Furthermore, the solar heat gain coefficient ($T_{TS}$) of the inventive infrared reflective film was calculated based on JIS R3106. $T_{TS}$ was 76%.

Working Example 4

An infrared reflective film, produced by the same procedure as in Working Example 3, was prepared. Again, glass and PVB produced in the same way as in Working Example 2 were prepared, and a laminated glass in which an infrared reflective film had been inserted was produced by the same procedure as in Working Example 2. The visible light transmittance of the obtained laminated glass in which an infrared reflective film had been inserted was 74%. When the reflection characteristics were measured in the same way, there was a near infrared reflective function exhibiting center reflective wavelengths at two wavelengths, namely about 1020 nm and about 1210 nm, in the same way as in Working Example 3. Moreover, $T_{TS}$ for this inventive laminated glass with an infrared reflective film inserted was 52%.

Comparative Example 1

Using prepared coating solutions (R3), (L3), (R4) and (L4), infrared reflective layers were respectively produced by the same procedure as in Working Example 1, then these laminated together, and an infrared reflective film comprising a total of four layers produced.

Figure 3:
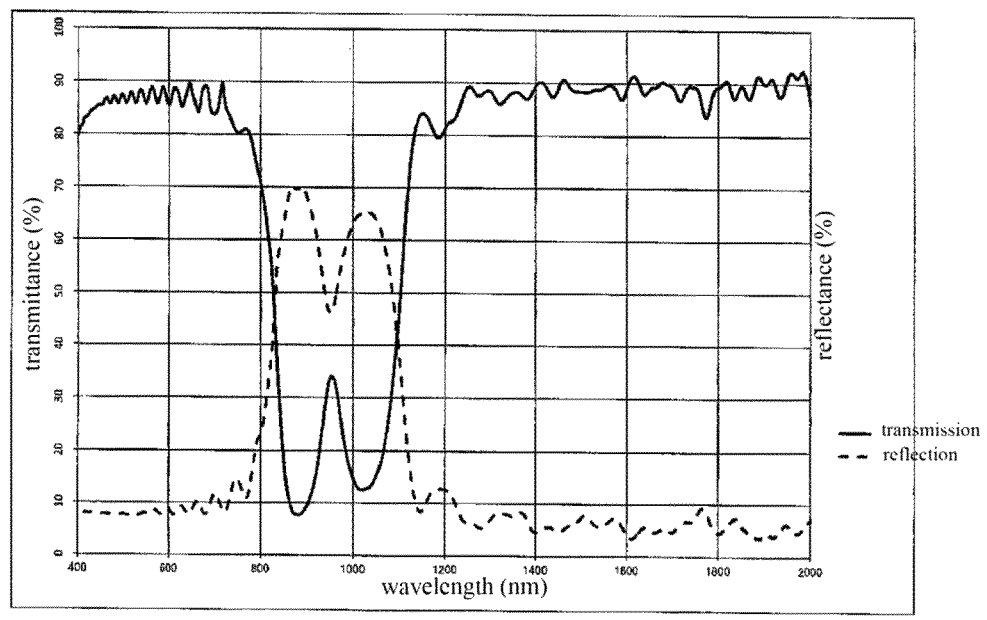
FIG. 3 is the optical spectrum of the infrared reflective film obtained in Comparative Example 1.

The optical characteristics of the infrared reflective film obtained were as shown in FIG. 3. With regard to the center reflective wavelengths, where (R3) and (L3) were employed the center reflective wavelength was about 870 nm, and where (R4) and (L4) were used the center reflective wavelength was about 1020 nm. Furthermore, the solar heat gain coefficient ($T_{TS}$) of the inventive infrared reflective film was calculated based on JIS R3106. $T_{TS}$ was 73%.

Comparative Example 2

An infrared reflective film produced by the same procedure as in Comparative Example 1 was prepared. Again, glass and PVB produced in the same way as in Working Example 2 were prepared, and a laminated glass with an infrared reflective film inserted was then produced by the same procedure as in Working Example 2. The visible light transmittance of the obtained laminated glass with an infrared reflective film inserted was 74%. When the reflection characteristics were measured in the same way, there was a near infrared reflective function exhibiting center reflective wavelengths at two wavelengths, namely about 870 nm and about 1020 nm in the same way as in Comparative Example 1. Moreover, $T_{TS}$ for the inventive laminated glass with an infrared reflective film inserted was 51%.

Heat-Shielding Evaluation

Figure 4:
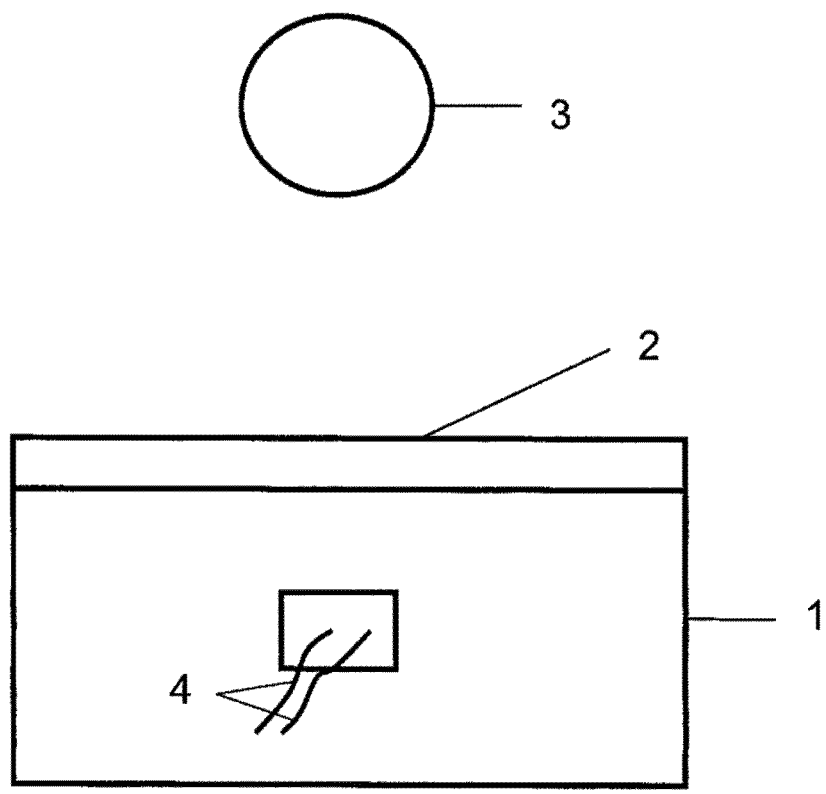
FIG. 4 is a schematic drawing of equipment for measuring the heat-shielding effect.

As shown in FIG. 4, one face of a highly heat-insulating box 1 (length 28 cm×width 20 cm×depth 15 cm), the inner faces of which were blackened, was opened up and at this face there was set the infrared reflective film 2 obtained in Working Examples 1 or 3, or in Comparative Example 1, respectively, such that the interior of the box was an airtight space. Irradiation was performed for 30 minutes using an IR lamp 3 (made by Toshiba) positioned about 300 mm from the laminate, after which the temperature of the box interior was measured with a thermocouple 4 in each case. The results are shown in Table 5.

TABLE 5

|  | $T_{TS}$ (%) | Temperature of the Box Interior Space (° C.) |
|---|---|---|
| Working Example 1 | 79 | 66 |
| Working Example 3 | 76 | 69 |
| Comparative Example 1 | 73 | 75 |

From the above, when Working Examples 1 and 3, and Comparative Example 1 are compared, it can be seen that, in spite of the infrared reflective film of the present invention having a similar four-layer structure but a higher $T_{TS}$ when compared to Comparative Example 1, the temperature of the box interior space is lower and the heat-shielding performance raised.

Furthermore, the laminated glass with an inserted infrared reflective film obtained in Working Examples 2 or 4, or in Comparative Example 2, respectively, was set in the heat-insulating box shown in FIG. 4 instead of the infrared reflective film, and the temperature of the box interior space measured in the same way. The results are shown in Table 6.

TABLE 6

|  | $T_{TS}$ (%) | Temperature of the Box Interior Space (° C.) |
|---|---|---|
| Working Example 2 | 54 | 60 |
| Working Example 4 | 52 | 62 |
| Comparative Example 2 | 51 | 63 |

From the above, when a comparison is made of the laminated glasses shown in Working Examples 2 and 4, and in Comparative Example 2, each of which has an inserted infrared reflective film and also employs an infrared-absorbing type intermediate film, it can be seen that, despite the working examples having a higher $T_{TS}$ when compared to the comparative example, the temperature of the box interior space is the same or lower and the heat-shielding performance raised.

Industrial Application Potential

By employing the infrared reflective film of the present invention for the windows, etc., of buildings, vehicles or refrigerated display cases, etc., a rise in temperature therein can be suppressed and the power consumed by air conditioners can be lowered, so energy savings can be realized. Furthermore, since transmittance in the vicinity of 780 nm to 950 nm of the near infrared region is high, it is possible to reduce communication problems. In particular, by application, as the windscreens of vehicles in the form of a laminated glass, it is possible to suppress a rise in temperature due to sunlight entering the vehicle, while still maintaining high transparency in the visible region.

EXPLANATION OF THE NUMERICAL CODES

1 highly thermally-insulating box
2 infrared reflective film, or laminated glass with an inserted infrared reflective film
3 IR lamp (made by Toshiba)
4 thermocouple

The invention claimed is:

1. A laminated glass, comprising:
   a first sheet of glass;
   a first intermediate film;
   an infrared reflective film;
   a second intermediate film; and
   a second sheet of glass;
   wherein the infrared reflective film is interposed between the two sheets of intermediate film, and the first intermediate film, the infrared reflective film and the second intermediate film are laminated between the first and second sheets of glass;
   wherein the infrared reflective film is selected from the group consisting of:
   i) a film consisting of infrared reflective layers having center reflective wavelength values between 1200 and 1300 nm and between 1500 and 1600 nm, said film having at least two infrared reflective layers, the a center reflective wavelength of at least one infrared reflective layer is between 1200 and 1300 nm and, furthermore, a center reflective wavelength of at least one infrared reflective layer is between 1500 and 1600 nm; and
   ii) a film consisting of infrared reflective layers having center reflective wavelength values between 1200 and 1300 nm and between 1000 and 1100 nm, said film having at least two infrared reflective layers, the center reflective wavelength of at least one infrared reflective layer is between 1200 and 1300 nm and, furthermore, the center reflective wavelength of at least one infrared reflective layer is between 1000 and 1100 nm;
   wherein
   the at least two reflective layers are laminated together by a pressure-sensitive adhesive, and
   the transmittance at the center reflective wavelengths of the respective infrared reflective layers is no more than 50% and the reflectance is at least 30%.

2. The laminated glass of claim 1, wherein the infrared reflective layers are formed by the fixing of a cholesteric liquid crystal phase.

3. The laminated glass according to claim 1, wherein at least one sheet of the intermediate films comprises an infrared absorbing agent.

4. The laminated glass according to claim 1, wherein said infrared reflective film consists of 2 to 12 superimposed infrared reflecting layers.

5. The laminated glass according to claim 1, wherein said infrared reflective performance of the infrared reflective layers is such that a transmittance in the near-infrared region of 780 to 950 nm is at least 60%.

6. The laminated glass according to claim 1, wherein the infrared reflective layers of the infrared reflecting film consist of one selected from the group consisting of a) b) and c);
   a) at least two infrared reflective layers, the center reflective wavelength thereof being between 1200 and 1300 nm,
   b) at least two infrared reflective layers, the center reflective wavelength thereof being between 1500 and 1600 nm, and
   c) at least two infrared reflective layers, the center reflective wavelength thereof being between 1000 and 1100 nm.

7. The laminated glass according to claim 1, wherein said infrared reflecting film is obtained by lamination of a total of four infrared reflecting layers, the four reflective layers being:

a) a layer obtained by fixing a right-handed helical cholesteric liquid crystal phase of center reflective wavelength 1200 nm to 1300 nm,
b) a layer obtained by fixing a left-handed helical cholesteric liquid crystal phase of center reflective wavelength 1200 nm to 1300 nm,
c) a layer obtained by fixing a right-handed helical cholesteric liquid crystal phase of center reflective wavelength 1500 nm to 1600 nm, and
d) a layer obtained by fixing a left-handed helical cholesteric liquid crystal phase of center reflective wavelength 1500 nm to 1600 nm.

8. The laminated glass according to claim 1, wherein said infrared reflecting film is obtained by lamination of a total of four infrared reflecting layers, the four reflective layers being:
a) a layer obtained, by fixing a right-handed helical cholesteric liquid crystal phase of center reflective wavelength 1200 nm to 1300 nm,
b) a layer obtained by fixing a left-handed helical cholesteric liquid crystal phase of center reflective wavelength 1200 nm to 1300 nm,
c) a layer obtained by fixing a right-handed helical cholesteric liquid crystal phase of center reflective wavelength 1000 nm to 1100 nm, and
d) a layer obtained by fixing a left-handed helical cholesteric liquid crystal phase of center reflective wavelength 1000 nm to 1100 nm.

* * * * *